US006684471B2

(12) United States Patent
Jones

(10) Patent No.: US 6,684,471 B2
(45) Date of Patent: Feb. 3, 2004

(54) DOOR HINGE PIN REMOVER TOOL

(76) Inventor: Grant Jones, 31582 Crystal Sands, Laguna Niguel, CA (US) 92677

(*) Notice: Subject to any disclaimer, the term of this patent is extended or adjusted under 35 U.S.C. 154(b) by 0 days.

(21) Appl. No.: 10/176,731

(22) Filed: Jun. 26, 2002

(65) Prior Publication Data

US 2004/0000044 A1 Jan. 1, 2004

(51) Int. Cl.[7] .................................................. B23P 19/04
(52) U.S. Cl. .......................................................... 29/244
(58) Field of Search .......................... 29/275, 276, 255, 29/280, 253, 278, 270, 267, 244

(56) References Cited

U.S. PATENT DOCUMENTS 5,365,649 A * 11/1994 Carl et al. .................... 29/267
5,438,743 A * 8/1995 Simington et al. ............ 29/275
5,875,535 A * 3/1999 Canoy ......................... 29/275
5,896,607 A 4/1999 Hagen
6,256,855 B1 7/2001 Schall
6,298,512 B1 10/2001 Hagen
6,351,881 B1 3/2002 Peckich et al.

* cited by examiner

*Primary Examiner*—Robert C. Watson
(74) *Attorney, Agent, or Firm*—Gary Appel

(57) ABSTRACT

A hinge pin remover tool comprising a housing block, an internal gear train for providing a high mechanical force advantage in a direction vertical and parallel with the housing block, front grooved face surface, to activate a vertical and horizontal movable pry head mechanism having a disc-beveled pry wedge, the jaw face end section adapted to be forced into a wedged interference contact position within the narrow gap space intersection that is formed between the front undershoulder of a hinge pin head and the hinge pin barrel enclosure top surface of a door hinge assembly. When the gear train is activated, the gear train forces the pry head mechanism to wedge the jaw face, disc-beveled pry wedge into the gap space intersection between the hinge pin front undershoulder and hinge pin barrel enclosure top surface to thereby push the hinge pin shaft vertically upward for subsequent removal from the hinge pin barrel housing enclosure.

7 Claims, 3 Drawing Sheets

DOOR HINGE PIN REMOVER TOOL

BACKGROUND OF THE INVENTION

1. Field of the Invention

The present invention relates generally to the field of hand tools, and more particularly to a tool hand tool for the removal of a hinge pin from a door hinge assembly.

2. Background Discussion

Various inventions have been previously disclosed for hinge pin removal tools, and combination tools having a hinge pin removal feature. Many of the previous inventions that disclose hinge pin removal apparatus cause hinge or door damage, require undesirable strong impact concussion forces, or have insufficient leverage to first free, and then remove the hinge pin easily from its parent hinge assembly.

The present invention provides a tool hinge pin removal tool having the capability for producing a strong increase in mechanical advantage force to effect the hinge pin extraction by a housing block assembly having an internal gear train subassembly, combined with a cooperating pry head subassembly mechanism, and a positional retaining ring, the housing block assembly component members cooperating together to thus obtain a stronger extracting mechanical force than the previous hinge pin removal methods and devices.

Such previous U.S. Patents include U.S. Pat. Nos. 5,896,607, 6,256,855, 6,298,512, and 6,351,881.

U.S. Pat. No. 5,896,607 discloses a multi-purpose hinge pin remover with a hand guard, which can be used as a pry bar. The multi-purpose hinge pin remover has a hand guard, a hammer head, and two additional working surfaces for repairing shingles.

U.S. Pat. No. 6,256,855 discloses a tool for removing a hinge pin from a hinge assembly to facilitate the removal of doors. It comprises a pair of plier members, each with a jaw portion and a handle portion. The jaws of the plier member are made to fit around the shaft of a hinge pin where a force is applied in the removal of the hinge pin.

U.S. Pat. No. 6,298,512 discloses the same hinge pin remover with a hand guard as in U.S. Pat. No. 5,896,607. However, it has the two new additions: a pry ridge added to the V-pry bar, and a threaded hole to receive a variety of work tools. This multi-purpose hinge pin and plastic clip remover comprises a bar shape with a claw having a V-shaped pry bar with a top surface designed to fit under a plastic cap.

U.S. Pat. No. 6,351,881 discloses a hinge pin remover with a head, a distal end; and a cylindrical stem portion. It comprises a bar portion with a first and second end portion. The first end portion has a flat tip with a concavely curved edge used to insert between the head of a hinge pin and a hinge to wedge the hinge pin and hinge apart. The second end portion consists of a cylindrical projection used as a handle to displace the pin from the hinge plate.

These and other prior art U.S. Patents are hinge damage prone because they require the application of the brute force of a hammer impact in combination with a prying screwdriver or chisel applied to the front undershoulder of the hinge pin, or are ineffectual because they fail to apply sufficient mechanical force to remove the hinge pin from its hinge assembly.

SUMMARY OF THE INVENTION

A hinge pin removal tool is disclosed comprising a housing block assembly containing subassembly component members including a housing block subassembly, an internal gear train subassembly, which when the gear train subassembly is activated, a moveable pry head subassembly mechanism attached to the gear train subassembly, moves in parallel relationship vertically upward, causing the pry head subassembly mechanism, horizontal jaw face end section having a disc-beveled pry wedge surface to press against, into, and then under the hinge pin front undershoulder that is held against and between the retention contact combination of the front face groove of the housing block, the disc-beveled pry wedge surfaced, of the jaw face end section of the pry head subassembly mechanism, and the beveled inner diameter of the retaining positional ring extending outward from the housing block subassembly. The housing block subassembly is fabricated with a semi-circular, vertically grooved, front face surface for longitudinally facing, containing and exerting a base pressure on the front surface of the hinge pin barrel housing of the hinge assembly, and further contains a horizontally protruding, retaining positional ring mounted on the housing block front face upper surface to locate and position for extraction the hinge pin shoulderhead with respect to and in proper relationship with the jaw face end section, disc-beveled pry wedge surface, of the hinge pin removal tool. The gear train has a drive gear shaft extension protruding backward and outward from its central longitudinal axis, which when rotated, drives the gear train to move its mating rack gear base bar vertically upward, where it transmits a like vertical, parallel upward force to a connecting rod attached to the pry head subassembly mechanism, screw tail end section, and also to the disc-beveled pry wedge surface, jaw face end section, that has been pre-positioned to press against and under the hinge pin front undershoulder, for moving and urging the hinge pin vertically upward, and thereby, displacing the hinge pin from the hinge assembly.

An object of the present invention is to provide a hinge pin removal tool with the high mechanical advantage force needed to efficiently and simply remove the hinge pin from the hinge assembly without damage to nearby surfaces.

Another object of the present invention is to provide a hinge pin removal tool that does not require the application of high concussion force, such as a hammer.

Another object of the present invention is to provide a hinge pin removal tool employing the high mechanical advantage of a gear train.

BRIEF DESCRIPTION OF THE DRAWINGS

The present invention can be more readily understood by a consideration of the following detailed description when taken in conjunction with the accompanying drawings, in which.

DESCRIPTION OF THE PREFERRED EMBODIMENT

Figures 1, 2, 3:
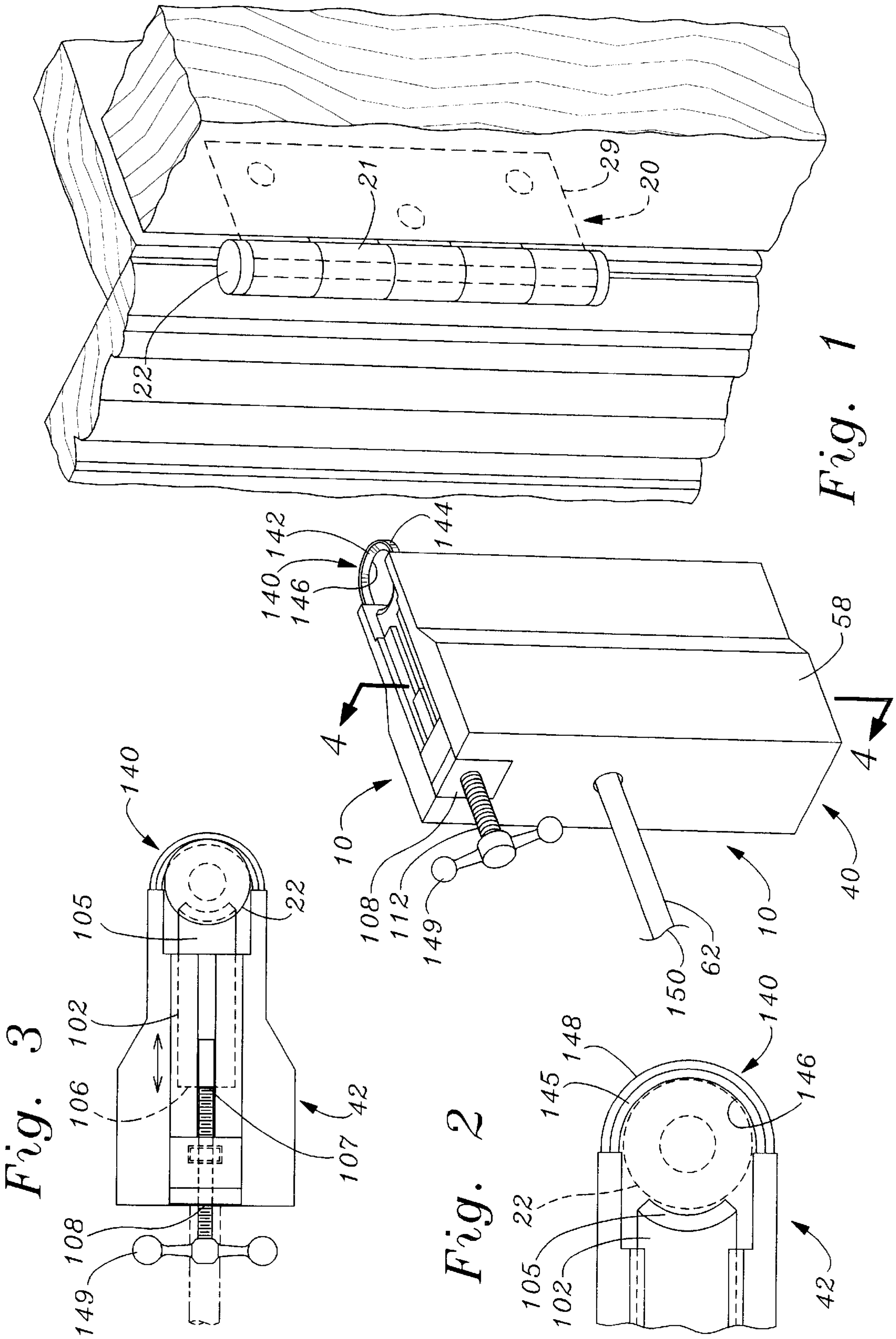
FIG. 1 illustrates perspective view of the invention.
FIG. 2 shows a top view of the in removal tool.
FIG. 3 shows a cross-sectional view of the hinge pin removal tool.

As shown in FIG. 1, a door hinge pin removal tool 10 has a housing block assembly 40 comprising a housing block subassembly 42 with an internal core cavity 44 adapted to hold and contain gear train subassembly 60, a pry head subassembly mechanism 100 attached to the vertical top end of the gear train subassembly 60 by a connecting rod 80, a retaining positional ring 140 extension protruding horizontally outward and attached to the front face surface 48 of the housing block subassembly 42 for engaging the hinge pin back undershoulder surface 26, and adapted for positioning the hinge pin removal tool 10 in proper spaced relationship to the hinge pin housing barrel 21, and driving means 150, removably attached to the drive gear shaft 62 of the gear train subassembly 60 for driving the drive gear teeth 64 against the rack gear teeth 72, to move the rack gear base bar 68 vertically upward in combination with the pry head subassembly mechanism 100, forward surface portion 105 of the jaw face end section 102.

The hinge assembly 20 comprises a hinge pin 22, a hinge pin barrel enclosure 21 enclosing the hinge pin 22, and flanges 29 for attachment to a door or similar object. The hinge pin 22 has a hinge pin shoulderhead with a front undershoulder area 24 and back undershoulder area 26, and a pin shaft 28. The hinge pin shaft 28 is generally inserted into and contained by the hinge pin barrel enclosure 21 and hinge pin flanges 29 to form the hinge assembly 20 for door mounting. In a hinge assembly, a narrow space gap 32 is normally formed and present between the intersection of the hinge pin head undershoulder 23 and the hinge pin barrel horizontal top surface 30 of the hinge pin barrel housing enclosure 21.

The housing block subassembly 42 has a front face 48, rear face 54, side face 58, top face 47, and bottom face 46. A longitudinal vertical hole is bored through the top face 47 and extends centrally downward between the housing top face 47 and bottom face 46, thereby forming an internal core cavity 44 to accommodate gear train subassembly 60. The back housing face 54 of the housing block subassembly 42 is provided with an in-line drive shaft through-hole 56 to accommodate the drive gear shaft 62 of the gear train subassembly 60, and protrudes externally outward from the housing block back surface 54 for detachably connecting the drive gear shaft to a rotational driving means 150. The front face surface 48 of the housing block subassembly 42 is provided with a longitudinal, semi-circular, centrally located, recessed groove channel 52 extending vertically downward between the housing block top face surface 47, and bottom face surface 46, and is adapted to receive and restrain the hinge pin barrel housing 21 of the hinge assembly 20, and to hold the door hinge pin removal tool 10 in position to achieve vertical alignment and mating contact with the hinge pin barrel enclosure 21 of the hinge assembly 20.

Figure 5:
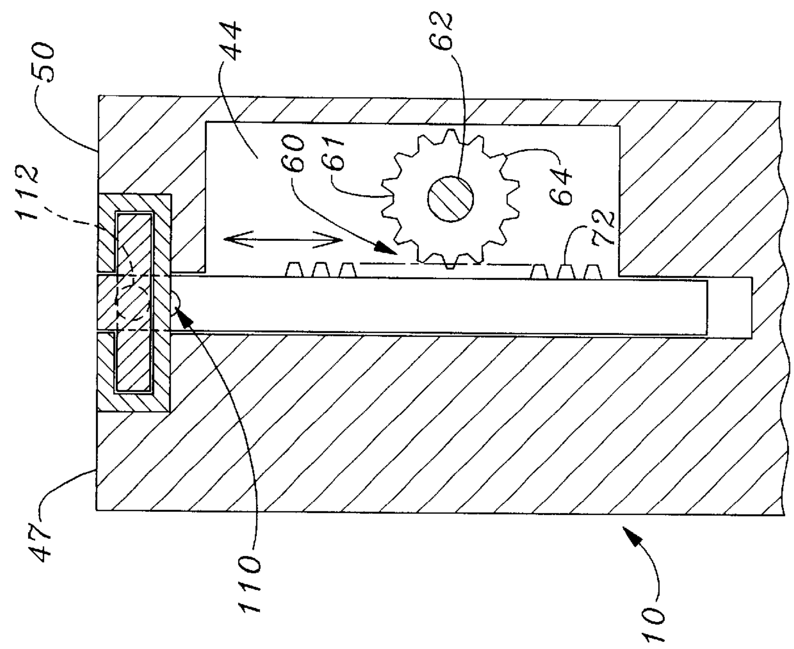
FIG. 5 show cross-sectional of the pin removal tool in partial removal of the hinge pin from the hinge.
Figure 4:
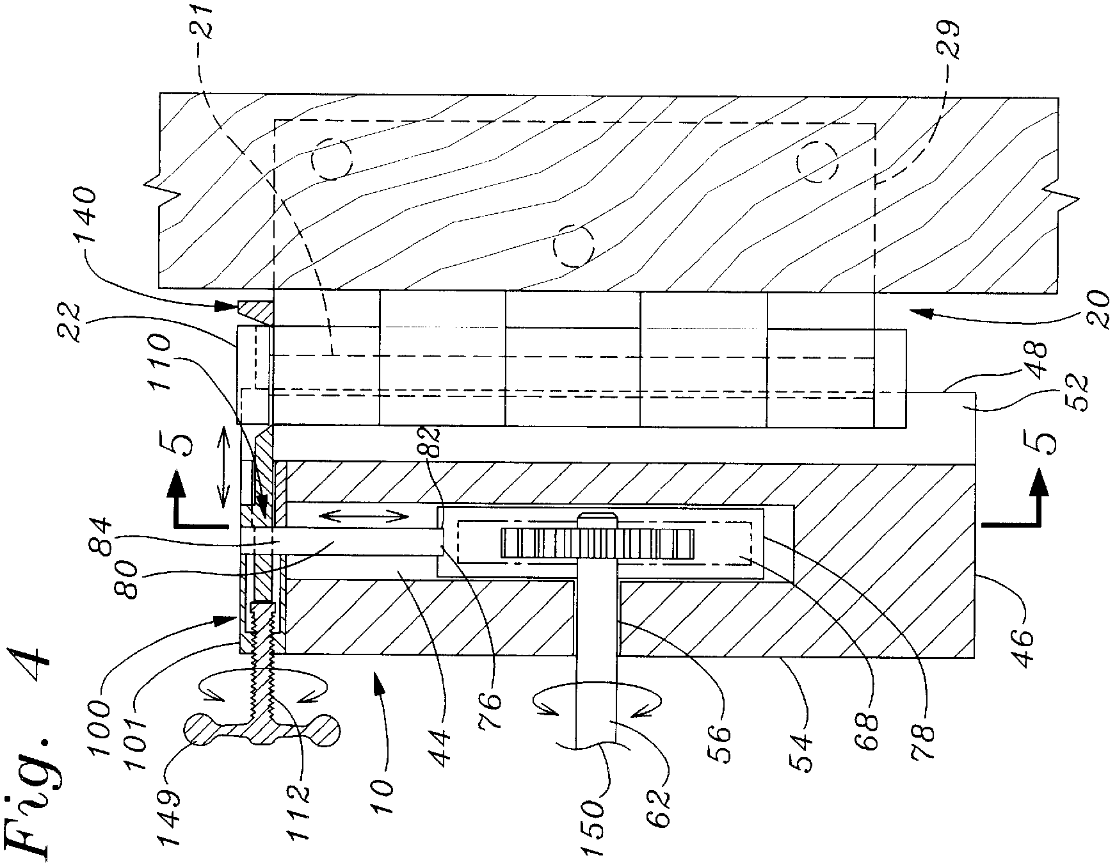
FIG. 4 shows cross-sectional view illustrating the pin removal tool in position to remove the pin from the hinge.

As shown in FIGS. 4 and 5, the gear train subassembly 60 consists preferably of a drive the gear member 61 meshing with a vertically aligned, rack gear base bar member 68. Protruding outward from the central axis of the worm drive gear and through the housing block rear face surface 54 is a cylindrical drive shaft 62 adapted for engagement with a torque producing, rotational driving source 150.

Attached to the top end surface 76 of the vertical rack gear base bar 82 is the lower end 82 of a vertical connecting rod 80, so attached as to stand vertically upward and parallel with the housing block front face longitudinal groove channel 52. The vertical upward movement of the rack base bar 68 causes the attached vertical connecting rod 80 to also rise vertically upward with the upper end 84 of the vertical connecting rod 80, that is connected to the proximal screw tail end section 101 of the pry head mechanism subassembly 100.

As shown in FIGS. 2 and 3, the pry head mechanism subassembly 100 has a distal jaw face end section 102 and an opposing proximal screw tail end section 102, the frontward jaw face end section 105 of the pry head mechanism subassembly 100 is adapted to engage and penetrate the space gap intersection 32 formed between the hinge pin front undershoulder 24 and the hinge pin barrel enclosure 21 horizontal top surface.

Figure 6A:
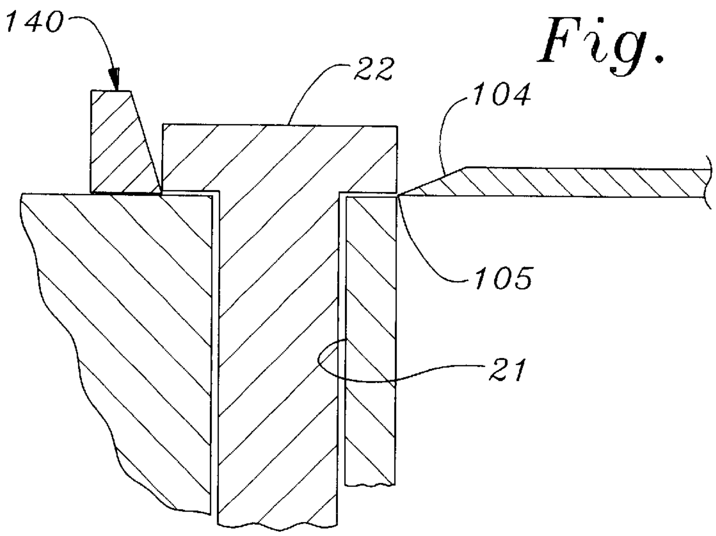
FIGS. 6A, 6B, and 6C show cross-sectional views of the removal tool in operation.
Figure 6B:
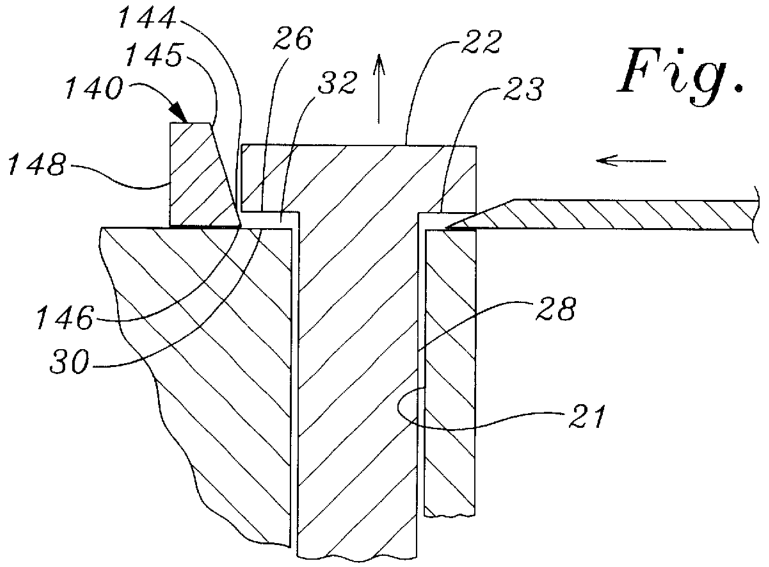
Figure 6C:
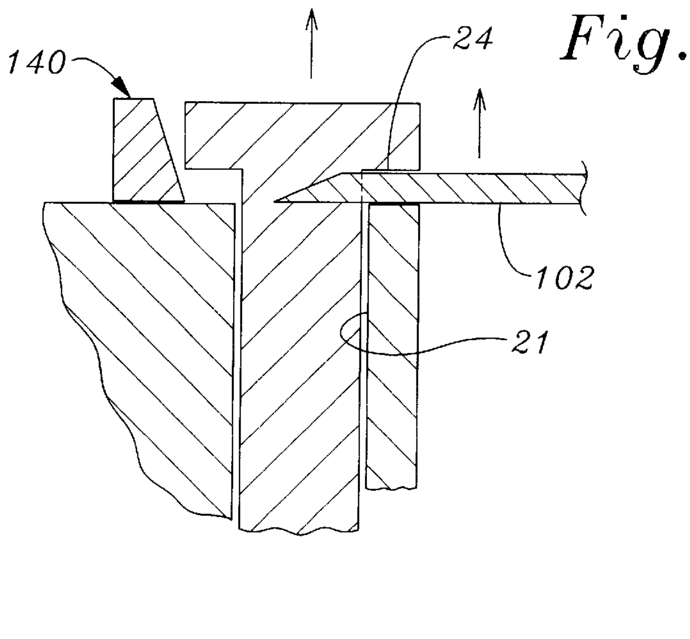

As shown in FIGS. 6A, 6B, and 6C, the screw tail end section 101 is adapted to apply pressure such as with a hand lever 149, to the rear end surface 106 of the jaw face end section 102 to forceably wedge engage the jaw face end section 102 into the narrow space gap intersection 32 formed between the hinge pin front undershoulder 24 and the hinge pin barrel enclosure horizontal top surface 30, and then by additional turns of the tail screw 112, force the frontward jaw face end section 105 further into the narrow space gap 32 area, squeezing and displacing the hinge pin 22 vertically upward to free the hinge pin 22 from its hinge pin barrel enclosure housing 21.

The forward portion 105 of the jaw face end section 102 is configured with a downward disc-beveled pry wedge surface 104 to provide a wedged leveraging force upward and against the hinge pin front undershoulder 24, thereby increasing prying force effectiveness. The pry head mechanism subassembly 100, proximal tail screw end section 101, advancing mechanism includes a captive drive screw 112, which when advanced, drives the jaw face end section 102, disc-beveled pry wedge surface 104 further forward to enlarge and thus widen the narrow space gap intersection area-32.

A horizontal, circular retaining positional ring 140, slightly larger in size than the hinge pin shoulderhead 23, is provided and attached to the housing block subassembly front top surface 48, where it protrudes horizontally outward and extends forward from the housing block subassembly 42 front upper surface 50 to first slip over, and then downward to engage, retain, and secure the hinge pin back undershoulder 26 against the hinge pin removal tool 10 movable, jaw face end section 102, disc-beveled pry wedge surface 104, of the pry head subassembly mechanism 100. The internal diameter 145 of the retaining positional ring 140 may be bevel edged 146 to facilitate contact engagement.

The pry head subassembly mechanism 100, and the horizontal retaining positional ring 140 are in parallel opposed relationship with respect to each other, so that the disc-beveled pry wedge surface 104 of the jaw face end section 102 prying action occurs at and in the gap space intersection 32 of the front hinge pin undershoulder 24 of the hinge pin head and the hinge pin enclosure barrel 30, horizontal top surface of the hinge assembly 20, when the retaining positional ring 140 is slipped over to secure and hold retention contact with the hinge pin back undershoulder 26, while the prying disc-beveled pry wedge surface 104 of the jaw face end section 102 of the pry head mechanism subassembly .100 continues to penetrate and enlarge the hinge intersection gap space 32 area of the hinge assembly 20.

As shown in FIGS. 6A, 6B, and 6C, in operation, the housing block subassembly 42 retaining positional ring 140 is first placed over the hinge pin head, so that the housing block subassembly 42 is then base supported, and the hinge pin barrel enclosure 21 rests in the grooved face front surface 52 of the housing block subassembly 42 to thereby engage, press and maintain contact against the front surface of the hinge pin housing enclosure barrel 21 of the hinge assembly 20. The hinge pin enclosure barrel 21 acts as a base support for the door pin removal tool 10, when the housing block assembly, horizontal retaining positional ring 140, fully engages the backside surface of the hinge pin head undershoulder of the hinge pin 22, which is secured in the hinge pin barrel enclosure 21 of the hinge assembly 20.

The horizontally and vertically movable, pry head mechanism subassembly 20, is torgued forward, with either a drive screw 112 or hand lever 149, moving the pry head subassembly mechanism 100, jaw face end section 102, centrally forward to engage under and against the hinge pin front undershoulder 24 of the hinge assembly 20 and into the narrow gap space 32 formed between the intersection of the hinge pin front undershoulder and the hinge pin barrel horizontal top surface 30.

Additional torguing of the pry head subassembly mechanism 100, screw tail end section 101, forces forward the jaw face end section 102, disc-beveled pry wedge shaped surface 104 against the hinge pin front undershoulder 24 contact surface.

A driving means 150 is then applied to the drive gear shaft 62, thereby causing the drive gear teeth 64 to rotate and engage its mating rack gear teeth 72. The rack gear base 68 then forces the connecting rod 80 vertically upward, parallel, and along the longitudinal axis of the housing block subassembly 42, where the high mechanical force advantage generated by the gear train subassembly 60, the connected horizontal pry head subassembly mechanism 100, jaw face end section 102, disc-beveled pry wedge surface 104, to more fully engage the front undershoulder 24 of the hinge pin head, while the retaining positional ring 140 holds the hinge pin head against the disc-beveled pry wedge surface 104, to aid in the prying vertical, upward movement being applied for mechanically displacing and extracting the hinge pin 22 from the hinge pin barrel enclosure 21.

When the driver means 150 is activated by applying a rotational force to the drive gear shaft 62 of the worm gear, the drive gear teeth 64 of the gear train subassembly 100, engage the gear teeth of its mating gear rack 72 to transmit a high mechanical advantage force to the mating rack gear base bar 68, and thereby, force displacement of the gear rack base bar 68 vertically upward through a vertical connecting rod 80 linkage, to transmit a like force to the pry head mechanism subassembly 100, and then to the disc-beveled pry wedge surface 104 of the jaw face end section 102, and then along the line of interference contact between the front undershoulder surface 24 of the hinge pin head and the hinge pin barrel enclosure 21 horizontal top surface 30, thus forcing the hinge pin 22 upward along its longitudinal axis, in parallel vertical relationship with the longitudinal axis of the horizontal disc-beveled pry wedge surface 104 of the jaw face end section 102.

The pry head subassembly mechanism 100 vertical force movement is transmitted by means of a vertical connecting rod 80, having a first attaching portion at the lower vertical end 82 adapted for connection to the vertical top end 76 of the gear rack base bar 68, and has a second attaching portion at its upper vertical end 84 formed to attach to the screw tail end section 101 of the slidable horizontal pry head mechanism subassembly 100, having a distal jaw face end section shaped as a disc-beveled pry wedge surface 104 extending outward and perpendicular to the housing block subassembly 42, front face surface 48. Upon activation, the disc-beveled pry wedge surface 104 of the jaw face end section 102, thus extends horizontally outward from the pry head subassembly mechanism 100, distal jaw face end section, to press the disc-beveled pry wedge surface 104 into and penetrate the gap space intersection 32 formed between the hinge pin front undershoulder and the hinge pin barrel housing enclosure 21, horizontal top surface 30 to leverage the hinge pin 22 from its hinge barrel enclosure 21.

A driving rotational means 150, such as a standard variable speed drill shaft motor, is applied to the drive gear shaft 62 of the drive gear, so as the drive gear 61 rotates, the gear rack base bar 68 through its vertical connecting rod 80 are forced integrally vertically upward in parallel relationship with the housing block front, face 48, and the pry head subassembly mechanism, thereby forcing the easy extraction and removal of the hinge pin 22 from, its hinge pin barrel housing 21.

Although there has been described above a door hinge pin removal tool in accordance with the present invention for purposes of illustrating the manner in which the present invention may be used to advantage, it is to be understood that the invention is not limited thereto. Consequently, any and all variations and equivalent arrangements, which may occur to those skilled in the applicable art, are to be considered to be within the scope and spirit of the invention, as set forth in the claims that are appended hereto as part of this U.S. Patent Application.

What is claimed is:

1. A tool apparatus for removing a hinge pin from the pin barrel enclosure housing of its hinge assembly comprising:

a housing block assembly having as components a housing block subassembly with a front face, a rear face, substantially parallel side faces, a top face, a bottom face, and a central core cavity, said front face being grooved and adapted to receive the hinge pin barrel enclosure housing of a hinge assembly;

a gear train subassembly adapted to fit inside and be positionally fixed within said central core cavity of said housing block; said gear train subassembly having a rack gear base bar member and a drive gear member with a central drive shaft; said rack gear base bar member having a bottom end and a top end; said bottom end facing said housing block bottom face surface and said top end facing said housing block top face surface;

a connecting rod having a lower end and an upper end, said lower end being attached to the top end of said rack gear base bar member;

a horizontally and vertically slidable pry head subassembly mechanism having a proximal adjustable screw tail end section and a distal horizontally and vertically slidable jaw face end section, said proximal screw tail end section being attached to said upper end of said connecting rod, and said distal jaw face end section being horizontally and vertically slidable, forward movable, and having a disc-beveled pry wedge shaped surface extending outwardly from said housing block subassembly and perpendicular to said rack gear base bar and said connecting rod;

said top end surface of said rack gear base bar member being attached to and transmitting a vertical upward force along and through said connecting rod upper end to the proximal tail end section of said pry head subsassembly mechanism, said horizontally and vertically slidable, forward moveable, jaw face end section having a disc-beveled pry wedge shaped surface adapted to wedge engage the narrow space gap intersection between the undershoulder surface of a hinge pin and the hinge pin enclosure barrel top surface of a hinge assembly;

said jaw face end section being movable and being driven forward horizontally by said tail screw end member engaging the rear surface of said jaw face end section, so that the rotational turning of the tail screw of said tail screw end section urges and wedges the disc-beveled pry wedge surface into said narrow space gap intersection formed by the hinge pin front undershoulder and the hinge barrel enclosure horizontal upper surface, to cause said housing block and said disc-beveled wedge surface to engage and penetrate said narrow space gap intersection;

a retaining positioning ring extending outward from and connected to one of said housing block surface, said retaining positional ring adapted to engage the back undershoulder surface of said hinge pin head, and act in combination with said housing block front face groove surface being held against the hinge pin barrel enclosure, to maintain integrated contact with said jaw face end section surface; and a driving force means applied to said gear train drive shaft to cause said drive gear to rotate and force said rack gear to move vertically upward with respect to the drive gear teeth, so as to urge said pry head subassembly mechanism upward and transmit a large mechanical force advantage to said beveled-disc pry wedge surface engaging said narrow gap intersection between said hinge pin head front undershoulder and said hinge barrel enclosure top surface, and thereby exert a strong, leveraged upward, vertical wedge pry force to extract the hinge pin from the hinge pin barrel enclosure of the hinge assembly.

2. The apparatus as claimed in claim 1, wherein said gear train drive gear is a pinion gear.

3. The apparatus as claimed in claim 1, wherein said retainer positional ring internal diameter is circular and internally beveled.

4. The apparatus as claimed in claim 1, wherein said jaw face end surface is disc-beveled.

5. The apparatus as claimed in claim 1, wherein said pry face subassembly mechanism has a jaw face end surface configured as a beveled forked spade.

6. The apparatus as claimed in claim 1, wherein said tail end section is adjustable by a hand lever.

7. An electro-mechanical tool apparatus for removing a hinge pin from the pin barrel enclosure housing of its hinge assembly comprising:

a housing block assembly having as components a housing block subassembly with a front face, a rear face, substantially parallel side faces, a top face, a bottom face, and a central core cavity, said front face being grooved and adapted to receive the hinge pin barrel enclosure housing of a hinge assembly;

a gear train subassembly adapted to fit inside and be positionally fixed within said central core cavity of said housing block; said gear train subassembly having a rack gear base bar member and a drive worm gear member with a central drive shaft; said rack gear base bar member having a bottom end and a top end; said bottom end facing said housing block bottom face surface and said top end facing said housing block top face surface;

a connecting rod having a lower end and an upper end, said lower end being attached to the top end of said rack gear base bar member;

a horizontally and vertically slidable pry head subassembly mechanism having a proximal adjustable screw tail end section with a tail screw adapted for providing horizontal adjustment of the distal face jaw end section, said proximal adjustable screw tail end section being attached to said upper end of said connecting rod, and said distal face jaw end section having a horizontally slidable, forward movable, disc-beveled pry wedge shaped surface extending outwardly from said housing block subassembly and perpendicular to said rack gear base bar and connecting rod;

said top end surface of said rack gear base bar member being attached to and transmitting a vertical upward force along and through said connecting rod upper end to the proximal tail end section of said pry head subassembly mechanism, said horizontally slidable, forward moveable, jaw face end section having a disc-beveled pry wedge shaped surface adapted to wedge engage the narrow space gap intersection between the undershoulder surface of a hinge pin and the hinge pin enclosure barrel top surface of a hinge assembly;

said jaw face end section being movable and being driven forward horizontally by said tail screw end member engaging the rear surface of said jaw face end section, so that the rotational turning of said tail screw of said tail screw end section urges and wedges the disc-beveled pry wedge surface into said narrow space gap intersection formed by the hinge pin front undershoulder and the hinge barrel enclosure horizontal upper surface, to cause said housing block and said disc-beveled pry wedge surface to engage and penetrate said narrow space gap intersection;

a retaining positioning ring extending outward from and connected to one of said housing block surface, said retaining positional ring having a portion of the internal diameter beveled and adapted to engage the back undershoulder surface of said hinge pin head, and act in combination with said housing block front face groove surface held against the hinge pin barrel enclosure, to maintain integral contact with said jaw face end section; and a driving means applied to said gear train drive shaft to cause said drive gear to rotate and force said rack gear to move vertically upward with respect to the drive gear teeth, so as to urge said pry head subassembly mechanism upward and transmit a large mechanical force advantage to said beveled-disc pry wedge surface engaging said narrow gap intersection between said hinge pin head front undershoulder and said hinge barrel enclosure upper surface, and thereby exert a strong, leveraged upward, vertical wedge force to extract the hinge pin from the hinge pin barrel enclosure of the hinge assembly.

* * * * *